United States Patent [19]

Sernaker

[11] 4,140,563

[45] Feb. 20, 1979

[54] METHOD OF MAKING EMBROIDERY TRANSFER

[75] Inventor: Howard Sernaker, Wynnewood, Pa.

[73] Assignee: Penn Textile Inc., Bala Cynwyd, Pa.

[21] Appl. No.: 839,246

[22] Filed: Oct. 4, 1977

Related U.S. Application Data

[62] Division of Ser. No. 664,605, Mar. 8, 1976, Pat. No. 4,092,451.

[51] Int. Cl.$^2$ ........................ B32B 31/20; D05C 17/00

[52] U.S. Cl. .................................... 156/148; 112/266; 156/155; 156/256; 156/331; 428/102; 428/914

[58] Field of Search ................. 156/94, 148, 155, 320, 156/321, 322, 327, 331; 428/187, 104, 102, 190, 196, 200, 203, 914; 112/104, 265, 266

[56] References Cited

U.S. PATENT DOCUMENTS

| | | | |
|---|---|---|---|
| 525,738 | 9/1894 | Hauser | 428/914 |
| 824,100 | 6/1906 | Diem-Beutler | 428/104 |
| 1,794,731 | 3/1931 | Portuesi | 428/187 |
| 1,905,989 | 4/1933 | Safir et al. | 428/102 |
| 3,463,692 | 8/1969 | Brunner | 428/104 |
| 3,567,567 | 3/1971 | Sherrill | 428/914 |
| 3,816,211 | 6/1974 | Haigh | 428/187 |
| 3,919,033 | 11/1975 | Gill et al. | 156/331 |
| 4,071,387 | 1/1978 | Schlaepfer | 156/148 |

*Primary Examiner*—Caleb Weston
*Attorney, Agent, or Firm*—Seidel, Gonda & Goldhammer

[57] ABSTRACT

The embroidery transfer disclosed has an embroidered pattern on one surface of a diaphanous polymeric plastic material and a layer of adhesive on the other surface. A portion of said one surface of the diaphanous material is exposed on said transfer and melts into a fabric when the transfer is applied to the fabric by heat and pressure.

6 Claims, 5 Drawing Figures

FIG. 1
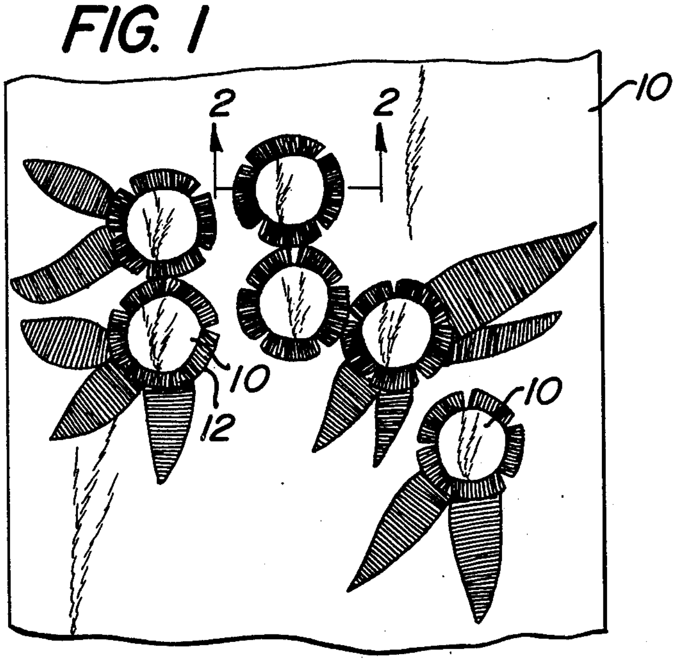
FIG. 3
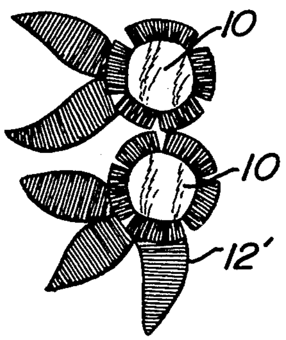
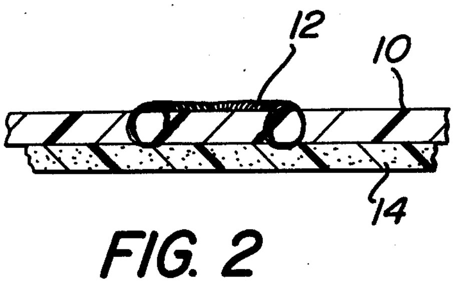
FIG. 2
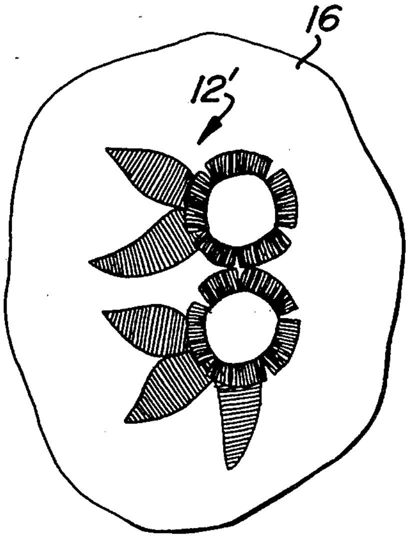
FIG. 5
FIG. 4
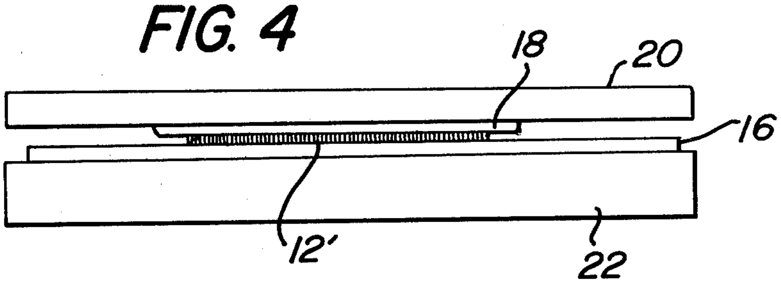

METHOD OF MAKING EMBROIDERY TRANSFER

This application is a division of Ser. No. 664,605 filed on Mar. 8, 1976 for Embroidery Transfer and now U.S. Pat. No. 4,092,451.

BACKGROUND

Embroidered transfers are believed to be classified in class 156. For relevant prior art, see U.S. Pat. Nos. 3,463,692; 3,657,060 and 3,816,211.

Embroidery transfers of the type disclosed in said patents are adapted to be applied to a fabric by application of heat and pressure. When such embroidery transfers are so applied to a fabric, it is apparent from inspection that such embroidery transfers were not embroidered directly onto the fabric. That is, it is apparent that the embroidered pattern was first applied to a base fabric or substrate which overlies the base fabric and gives the appearance of bulkiness.

The embroidery transfer of the present invention overcomes that objection. When the embroidery transfer of the present invention is applied to a base fabric, it has the appearance of having been embroidered directly onto the base fabric.

SUMMARY OF THE INVENTION

The embroidery transfer of the present invention includes a pattern embroidered onto one surface of a diaphanous polymeric plastic substrate but occupying less than the entire surface of said substrate so as to expose a portion of the substrate. A layer of adhesive on the opposite surface of the substrate bonds the threads of the pattern to the substrate and adds body to the entire embroidery transfer. The adhesive is a layer of polymeric plastic material.

When the embroidery transfer is applied to a base fabric by heat and pressure in a conventional manner, the said exposed portion of the substrate disappears in the sense that it is no longer visible. The heat applied to the transfer readily melts the exposed portion of the substrate so that it melts into the base fabric and/or on any cover cloth or pad forming a part of the heating platen.

It is an object of the present invention to provide a method for making an embroidery transfer which may be applied to a base fabric and give the appearance of having been embroidered directly onto the base fabric.

It is another object of the present invention to provide a method for making an embroidery transfer having sufficient body for ease of manipulation while having a pattern embroidered onto a substrate which will disappear upon application of heat and pressure.

It is another object of the present invention to provide a method of making an embroidery transfer which can be applied by heat and pressure and give the appearance of having been embroidered directly onto a base fabric.

Other objects will appear hereinafter.

For the purpose of illustrating the invention, there is shown in the drawings a form which is presently preferred; it being understood, however, that this invention is not limited to the precise arrangements and instrumentalities shown.

FIG. 1 is a plan view of a sheet of a diaphanous substrate onto which a pattern has been embroidered.

FIG. 2 is a sectional view on an enlarged scale taken along the line 2—2 in FIG. 1 after a layer of adhesive has been applied to the substrate.

FIG. 3 is a plan view of the embroidery transfer after it has been severed from the sheet of substrate.

FIG. 4 is a diagrammatic illustration of the embroidery transfer being applied to a base fabric.

FIG. 5 is a plan view of a portion of the base fabric to which the embroidery transfer has been applied.

Referring to the drawing in detail, wherein like numerals indicate like elements, there is shown in FIG. 1 a sheet of a diaphanous substrate 10. The substrate 10 is preferably a sheer material comparable to that used heretofore for making lingerie. The substrate 10 is transparent or at least translucent and can be white or pigmented depending upon the color of the base fabric to which the embroidery transfer of the present invention is to be applied. The preferred color of the substrate is white or what may be loosely termed colorless.

The substrate 10 is sold commercially as a shadow sheer fabric. I prefer to use a shadow sheer 100% nylon woven with 15 denier threads, and a thread count of 100 × 100. A material of this nature is very flimsy and has a thickness of about 0.002 or 0.003 inches. For the purposes of the present invention, the substrate 10 is as sheer as possible. The substrate 10 may be made from a polyamide such as nylon 6, nylon 66, nylon 11, nylon 12, or from a variety of polyesters, all of which are polymeric thermoplastic materials.

Using a Schiffli machine, an embroidery pattern 12 is applied over the length and width of the substrate 10. The pattern 12 may take any one of a wide variety of forms with the present invention being more advantageous wherein the form of the embroidery pattern involves a closed loop so as to have an exposed portion of the substrate 10 enclosed within a portion of the embroidered pattern 12. While pattern 12 as illustrated is simple, the present invention enables very intricate patterns to be used. The thread used for embroidering the pattern 12 is preferably of a natural fiber such as cotton. Because of the sheer nature of the substrate 10, less thread is needed to make any particular pattern as compared with prior art transfers disclosed in the above-mentioned patents.

After the embroidery pattern 12 has been applied over one surface of the substrate 10, a layer of adhesive 14 is applied to the opposite surface of the substrate 10. The layer of adhesive 14 adds body to the substrate 10 and bonds the portions of the thread forming the pattern 12 to the substrate 10 on that side of the substrate 10. Thereafter, the embroidery pattern 12 is cut from the substrate 10 to produce the embroidery transfer 12' shown in FIG. 3. The exposed portion of the substrate 10 within the confines of the pattern 12 remain and form a part of the embroidery transfer 12'.

The embroidery transfer 12' includes an exposed portion of the substrate 10 as well as a concealed portion of the substrate 10. The concealed portion of the substrate 10 is that portion beneath the threads forming the embroidery pattern 12. The adhesive 14 on the embroidery transfer 12' overlies each of said portions of the substrate 10. The adhesive 14 is preferably a transparent or colorless polymeric thermoplastic material applied in a layer not thicker than about 0.004 to 0.007 inches and compatible therewith and having a melting temperature which is lower than the melting temperature of the substrate 10. I prefer to use a shadow sheer nylon as the substrate 10 with the adhesive 14 likewise being a 100% nylon adhesive which is colorless and melts at a temperature of about 240° F. The substrate 10 has a melting temperature in the range of about 350–450° F.

The embroidery transfer 12' is applied to a base fabric 16 in the following manner. The base fabric 16 which may be any type of commercially available material is placed between the platens 20 and 22 of a press for applying heat and pressure. The embroidery transfer 12' overlies the fabric 16. A transfer cloth is placed over the embroidery transfer 12' if the platen 20 does not include a rubber pad 18.

Application of heat and pressure causes the adhesive 14 to melt and bond to the threads of the fabric 16. Also, the heat melts the substrate 10 and causes it to disappear by partially melting into the fabric 16 and into any transfer cloth or rubber pad 18 overlying transfer 12'. The transfer cloth or rubber pad 18 are not necessary but are preferred so as to prevent the formation of a shiny surface on the fabric 16 in those areas corresponding to the area of the exposed portion of the substrate 10 within the pattern 12.

Due to the sheerness of the substrate 10 and the material from which it is made, it virtually disappears on the base fabric 16 whereby the pattern 12 has the appearance of having been embroidered directly onto the base fabric 16. Due to the heat and pressure applied, the substrate 10 no longer exists as a woven substrate, but rather now is a film impregnated into the base fabric 16. Because of the diaphanous nature of the substrate 10, the base fabric 16 is not stiff in the area of the pattern 12 thereon.

The threads of pattern 12 are preferably a natural fiber such as cotton so as not to be scorched when transfer 12' is applied. The threads may be of synthetic fibers or a mixture if heat is applied at a radio frequency. The pattern 12 simulates a flower of one color thread such as pink and having leaves defined by threads of another color such as green. A large number of patterns are available for use with the present invention.

The present invention may be embodied in other specific forms without departing from the spirit or essential attributes thereof and, accordingly, reference should be made to the appended claims, rather than to the foregoing specification as indicating the scope of the invention.

I claim:

1. A method of making an embroidery transfer comprising the steps of machine embroidering a pattern onto one side of a diaphanous substrate of polymeric thermo plastic material, leaving a portion of said substrate exposed within said pattern, applying an adhesive of polymeric thermo plastic material having a melting point less than the melting point of said substrate, said applying step being accomplished so that the adhesive overlies the other side of said substrate and threads exposed on said other side of said substrate, and then cutting said substrate adjacent the outer periphery of said pattern to separate the pattern from said substrate and thereby produce a pattern and said exposed substrate portion which may be applied to a base fabric by application of heat and pressure.

2. A method in accordance with claim 1 including using a substrate woven from threads having a denier of about 15 and with a thread count of about 100 × 100.

3. A method in accordance with claim 2 including using shadow sheer nylon as the substrate.

4. A method in accordance with claim 1 including using a transparent polyamide as said adhesive.

5. A method in accordance with claim 4 wherein said step of embroidering a pattern exposes two discrete isolated exposed portions of said substrate with such portions being isolated by threads of the pattern on said one side of the substrate.

6. A method in accordance with claim 5 including embroidering said pattern with a portion of the pattern defined by threads of one color and a portion of the pattern defined by threads of another color.

* * * * *

UNITED STATES PATENT AND TRADEMARK OFFICE

CERTIFICATE OF CORRECTION

PATENT NO. : 4,140,563

DATED : Feb. 20, 1979

INVENTOR(S) : Howard Sernaker, Wynnewood, Pennsylvania

It is certified that error appears in the above-identified patent and that said Letters Patent are hereby corrected as shown below:

Line [ 73 ] is corrected to show the true assignee of record at the time of issuance of the patent as follows:

[ 73 ] Assignee: Howard Sernaker, Wynnewood, Pa.

Signed and Sealed this

*Twelfth* Day of *June 1979*

[SEAL]

*Attest:*

RUTH C. MASON
*Attesting Officer*

DONALD W. BANNER
*Commissioner of Patents and Trademarks*